United States Patent [19]

Saunders

[11] Patent Number: 5,385,135

[45] Date of Patent: Jan. 31, 1995

[54] ARROW REST AND PRESSURE BUTTON ASSEMBLY

[75] Inventor: Charles A. Saunders, Columbus, Nebr.

[73] Assignee: Saunders Archery Co., Columbus, Nebr.

[21] Appl. No.: 57,561

[22] Filed: May 6, 1993

[51] Int. Cl.⁶ .............................................. F41B 5/00
[52] U.S. Cl. .................... 124/44.5; 124/41.1; 403/315
[58] Field of Search .............. 124/44.5, 4.1., 24.1, 124/26; 411/259, 276, 286, 290, 333; 403/320, 315, 316, 362, 370, 373

[56] References Cited

U.S. PATENT DOCUMENTS

| | | | |
|---|---|---|---|
| 2,443,066 | 6/1948 | Breedlove | 411/259 |
| 3,494,347 | 2/1970 | Saunders | 124/44.5 |
| 4,074,674 | 2/1978 | Simo | 124/44.5 |
| 4,924,841 | 5/1990 | Smith | 124/44.5 |
| 5,081,980 | 1/1992 | Newbold | 124/44.5 |

OTHER PUBLICATIONS

"Archery" May 1974, Advertisement for Match-1 Arrow Rest, p. 45.

Primary Examiner—Randolph A. Reese
Assistant Examiner—Anthony Knight
Attorney, Agent, or Firm—Michael G. Berkman

[57] ABSTRACT

There is provided an adjustable archery arrow rest mounted on a threaded pressure button support shaft extending through and secured in a window wall of an archery bow. The arrow rest is formed with a unitary mounting yoke assembly including a pair of spaced parallel leg-like plates. An inner one of the plates is presented toward the window side wall of the bow. The opposed plates of the yoke assembly are formed with aligned transverse tapped bores into which the threaded button support shaft extends in threaded engagement. On their opposed inwardly-presented facing surfaces, the yoke plates are formed with cooperating fragmentary threaded sectors defining an inwardly tapering opening for receiving a mating bolt. Threaded advancement of a bolt into the tapered threaded opening forcibly urges the yoke arms apart, frictionally to stress engaged threads and to lock the yoke on the threaded pressure button support shaft. A downwardly extending outer plate of the yoke is reversely looped and carries an arrow rest at a generally upwardly directed terminus of the plate in a zone adjacent to a laterally-presented contact end of the pressure button.

14 Claims, 2 Drawing Sheets

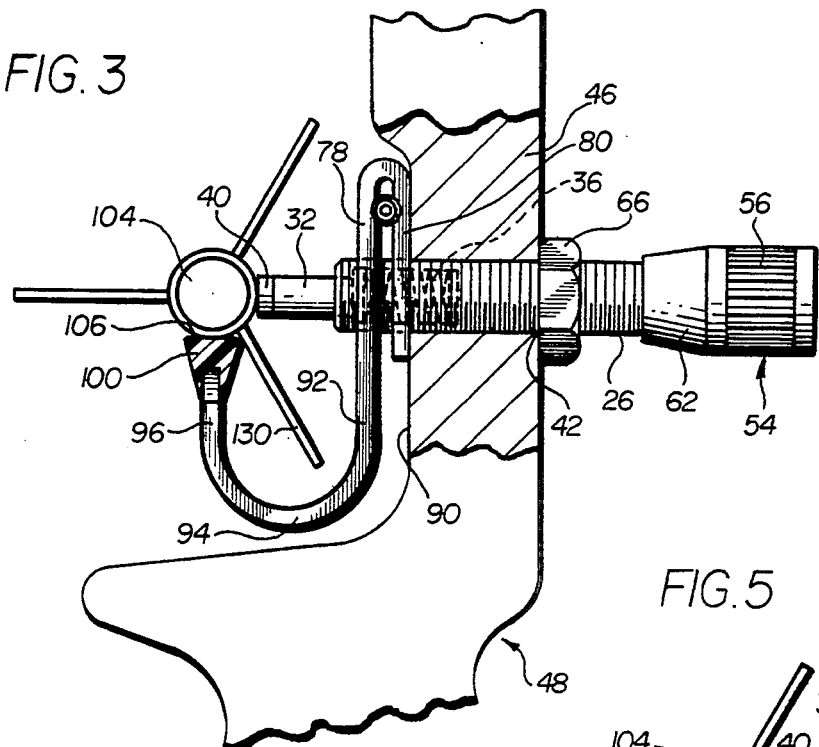
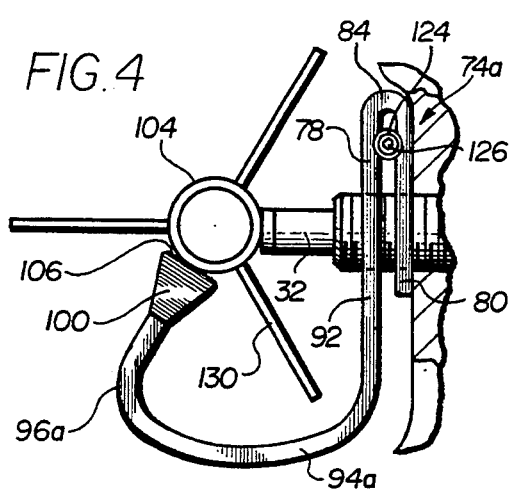
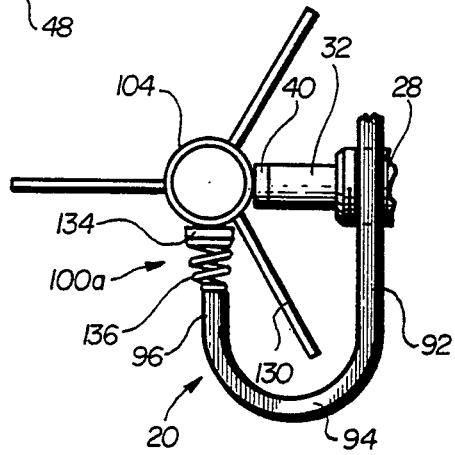
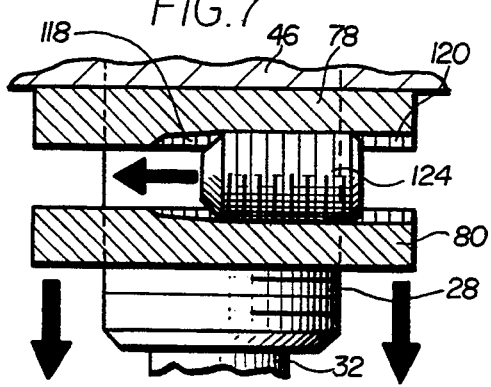
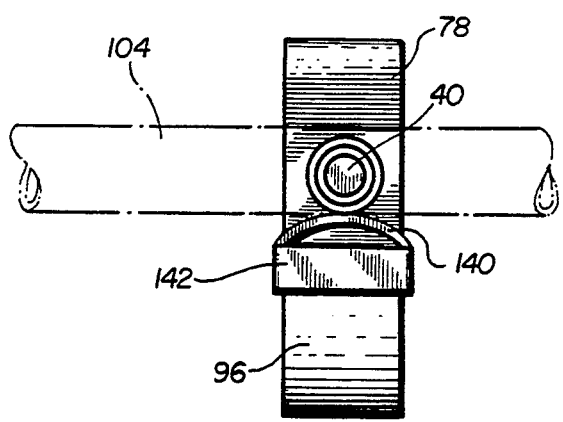

ARROW REST AND PRESSURE BUTTON ASSEMBLY

FIELD AND BACKGROUND OF THE INVENTION

The present invention relates to a combination arrow rest and pressure button assembly for archery use. More particularly, the invention is directed to an arrow rest which is attached to and carried on the same structure which supports the pressure button, attachment being on the window side of the window wall in a mid-portion of an archery bow.

Many different arrow rests as well as pressure buttons are described in archery-directed publications. Relevant literature also describes a broad variety of structures and mechanical arrangements offered as arrow rests. Pressure buttons are mounted in the window wall of the archery bow. The arrow rest is fastened to and supported on the side of the bow window. In other arrangements the rest is fastened to the window wall as a shelf extending therefrom and into the window. Pressure buttons and arrow rests have also been fabricated as composite or unitary assemblies. One such mechanical configuration is described in Saunders U.S. Pat. No. 4,809,669.

An arrow rest adhesively secured on the wall of the bow window is exceedingly difficult to adjust positionally. Convenient adjustment capabilities are desirable in order to accommodate arrow shafts differing in diameters and to achieve a correct operational position of the arrow preparatory to its release from the bow. Additionally, many proposed mechanical arrangements fail to establish a spatial orientation of the arrow rest with the pressure button, with the bow sidewall, and with the shelf of the bow window as will ensure a minimum of flight disrupting mechanical interference of feathers or vanes of the bow with structural bow components when the arrow shaft is propelled from the bow. Failure of the feathers or vanes of the arrow freely to clear the arrow rest or rest ledge and the window wall reduces arrow travel speed and accuracy. Uniformity and precision are impaired when there is interference with the arrow trajectory.

It is, therefore, a principal aim of the present invention to provide, for intercooperation with one another, an arrow rest and a pressure button. Each structure may conveniently be positioned and may readily be adjusted to provide, for each combination of bow and arrow, optimum placement, spacing and orientation. A minimum of interference between the arrow feathers or vanes and the bow and bow-carried ancillary structures, when the arrow is launched in flight, can thus be achieved.

SUMMARY OF THE INVENTION

The present invention provides an adjustable arrow rest mounted on a threaded pressure button support shaft.

It is an important feature of the invention that the threaded shaft which extends through the sidewall of the bow window, and from which an adjustably positionable pressure button extends to penetrate the window zone, is also used as the support for a positionable arrow rest of the invention.

A related feature of the invention is that the arrow rest is supported on the same shaft which supports the pressure button, and that the zone of support for the arrow rest is in that lineal section of the support shaft which projects into the bow window zone.

It is a feature of the invention that the pressure button projects axially from an end of a horizontal shaft which extends through the window wall of a bow and may readily and conveniently be positioned and locked to project to any selectable extent into the window zone.

Yet another feature of the invention is that the arrow rest may be selectively positioned along a horizontally extending length of the threaded shaft on which the rest is supported, along a lineal expanse of the shaft which projects into the window zone of the bow.

A very important related feature of the invention is that positioning of the pressure button and positioning of the arrow rest may be achieved independently through independent adjustments, thus providing extraordinary degrees of freedom to ensure establishment of optimum spatial relationships and orientations.

A related feature of the invention is that the arrow rest includes a two-legged yoke which is threadedly mounted on the shaft which also supports the pressure button, on a lineal section of the shaft projecting into the window zone of the bow, the yoke itself being shiftable lineally along the threaded support shaft.

Yet another feature of the invention is that the arrow-rest-carrying yoke defines a pair of spaced, parallel, vertically-extending plates formed on each of opposed facing inner surfaces thereof with horizontally-extending, threadedly-configured, aligned, elongate sectors defining, in combination, circumferentially-interrupted threads demarking a passage for receiving a mating threaded shank engaged therewithin.

A related feature of the invention is that the threadedly-configured, horizontally-extending passage between the plates of the arrow-rest-carrying yoke is tapered inwardly along its longitudinal expanse so that threaded advancement of a shank into the passage forces the plates of the yoke to diverge, thus establishing enhanced frictional forces between threads of the plates and threads of the support shaft to lock the yoke, and the yoke-carried arrow rest, against lateral displacement.

In one embodiment of the invention the pressure button and arrow-rest support shaft is threaded through a tapped bore extending horizontally through the bow at a window wall thereof, and a lock nut threaded on the shaft is positionable longitudinally along the shaft stressingly to abut the bow sidewall at a face of the wall opposite the bow window, to lock the shaft against lateral displacement with respect to the sidewall of the bow.

In a preferred embodiment of the invention the arrow-rest-supporting, shaft-mounted yoke includes an inwardly positioned plate and an outwardly positioned plate, the plates being parallel to one another, spaced from one another, and joined at their upper extremities. The outward plate has a downwardly extending portion which continues as a reversely looped extension projecting upwardly to form a base support for an arrow shaft.

It is a feature of a preferred embodiment of the present invention that a reversely-looped, upwardly directed leg of the shaft-mounted yoke of the of the invention is surmounted at its upwardly directed extremity with a capping element which is resiliently depressible and on which the shaft of an arrow bears preparatory to release of the arrow from the bow.

Yet another feature of the invention is that a downwardly directed, reversely looped leg of the arrow-rest-carrying yoke is contoured to provide at a zone below the pressure button and outwardly of the wall of the bow window an enlarged spatial area for ensuring unimpeded passage of an arrow-carried vane therethrough.

It is a feature of the invention that in one preferred embodiment an upper face of the rest on which the arrow shaft is supported is angled downwardly in a direction toward the window wall of the bow to provide, in cooperation with the pressure button of the assembly, a cradle to support the arrow shaft against lateral shifting.

Important features of the invention are that the pressure button may be readily positioned in selectable locations nearer to or farther out from the window wall of the bow, and also nearer to or displaced further from the arrow rest, and that these adjustments can be made independently.

Related advantages of the invention are that the arrow rest may be positioned nearer or farther from the wall of the bow window or nearer to or farther from the pressure button, and that these adjustments can also be made independently.

The unique and marked versatility in adjustability and in spatial positioning of the arrow rest and pressure button constitutes an exceedingly important feature of the assembly of the present invention.

In a preferred embodiment of the invention the end of the shaft carrying the pressure button is formed with a knurled finger grip zone to facilitate threadedly advancing the shaft into and withdrawing the shaft from the window zone of the bow.

In one embodiment of the invention a coil spring, held captive in a longitudinal cavity in an end segment of the support shaft, reliliently biases a piston-like pressure button to an extended mode.

Other and further objects, features and advantages of the invention will become apparent from the reading of the following specifications considered in conjunction with the drawings.

BRIEF DESCRIPTION OF THE DRAWINGS

FIG. 3 is a fragmentary, schematic, rear elevational view, partly broken away, of the bow-mounted combination pressure button assembly and arrow rest of the invention;

FIG. 4 is a fragmentary schematic, rear elevational view of a second preferred embodiment of the arrow rest of the invention;

FIG. 5 is a view similar to FIG. 4 but showing a third embodiment of the arrow rest of the invention;

FIG. 6 is a fragmentary, side elevational view showing yet another embodiment of the arrow rest component of the invention; and FIG. 7 is a cross-sectional view taken substantially on the lines 7—7 of FIG. 1 and showing the threaded tapered orifice defined by the spaced arms of the shaft-mounted yoke of the arrow rest, and the locking bolt engaged in the yoke to distort the yoke arms.

DETAILED DESCRIPTION OF THE ILLUSTRATED EMBODIMENTS

In accordance with the present invention, the aims and objects are achieved by providing, in cooperative combination, an assembly which includes a shaft-carried pressure button and an arrow rest which is carried on the same shaft, on that end of the shaft which projects into the window zone of an archery bow. Extremely significant novel features of the arrangement described are that the position of the pressure button with respect to the sidewall of the bow, and the position with respect to the arrow rest are adjustable independently. The same is true regarding the position of the arrow rest with respect to the pressure button and with respect to the window wall. It is also feasible simply and quickly to shift the pressure button and the arrow rest as a unit either further into or outwardly of the window zone.

The arrow rest is supported on a shaft-carried yoke, and the yoke itself is held secured and is selectively positionable by means of tapped transverse bores in the legs, through which bores the shaft is threadedly received. A threaded plug operationally engaged in a tapered thread-configured tapered passage between the legs of the yoke is advancable forcibly to urge the legs apart so as to establish interlocking frictional forces between the threads of the shaft and threads of the tapped leg bores through which the shaft passes. In this manner the yoke is locked in place on the same adjustably positionable threaded shaft which carries the pressure button.

Figure 1:
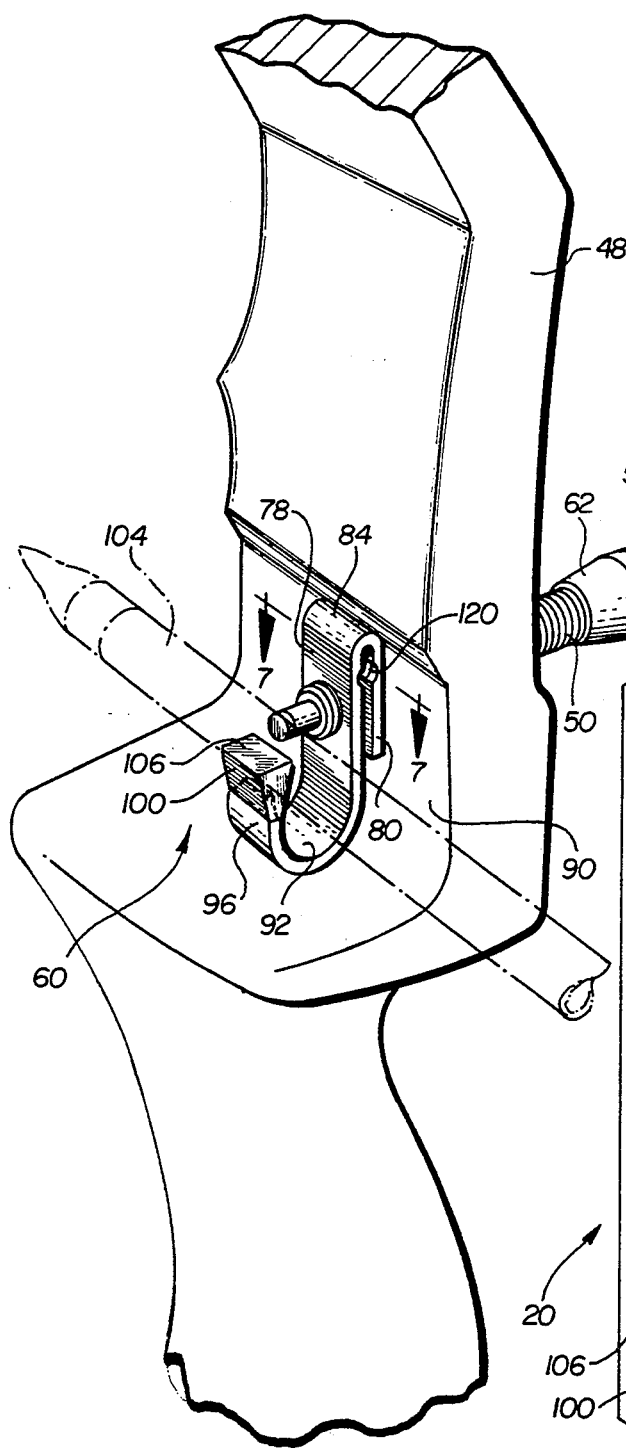
FIG. 1 is an enlarged fragmentary, schematic perspective view of a preferred embodiment of a pressure-button-support-shaft-mounted arrow rest, according to the invention, with an arrow in the shooting position.
Figure 2:
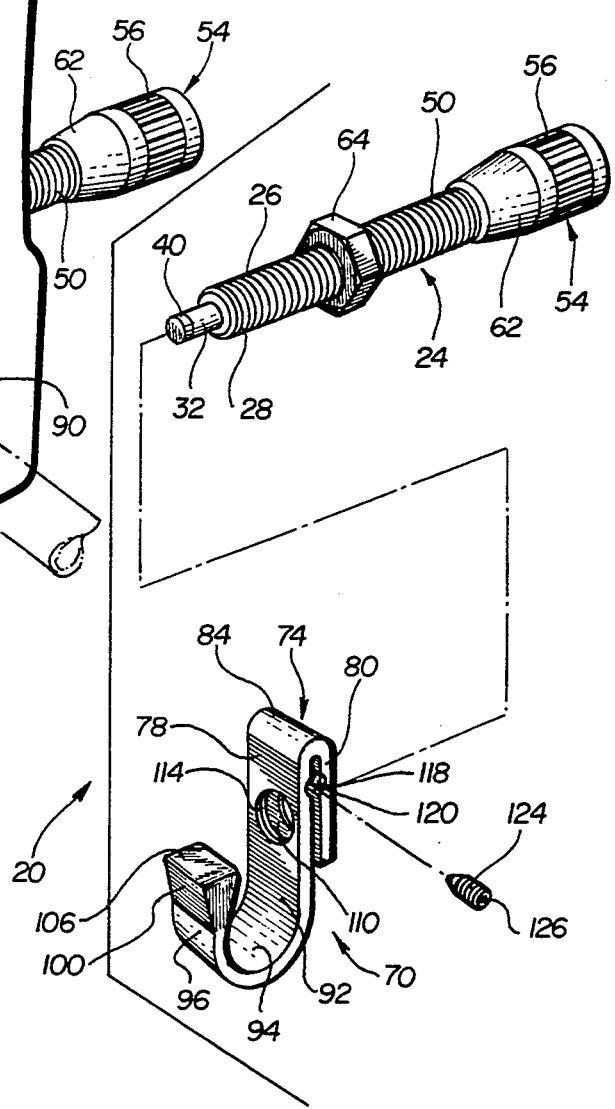
FIG. 2 is a fragmentary, exploded view showing the pressure button support shaft and indicating schematically the manner in which the arrow rest is attached to and frictionally secured thereon.

Referring now more particularly to the drawing, and initially to FIGS. 1, 2 and 3, for purposes of illustrative disclosure and not in any limiting sense, one preferred embodiment of the arrow rest and pressure button assembly 20 of the invention is shown as comprising an elongate shaft 24 formed with external threads 26 along its lineal expanse. The shaft 24 carries at its forward end 28 a cushion plunger or a pressure button 32 captive in the shaft 26 but projecting coaxially therefrom. A coil spring 36 confined in a cavity formed in a lineal segment of the shaft 26 bears resiliently against the pressure button 32 to bias the button 32 to an extended, projecting mode (FIG. 3). At its extended end the projecting pressure button 32 is finished with a low-friction, high lubricity tip 40.

As shown in FIGS. 1 and 3, the pressure-button-carrying shaft 24 is threadedly engaged within and extends through a threaded transverse bore 42 in the vertically extending window wall 46 of the bow 48. At its end 50 remote from the pressure-button-carrying, end 28, the threaded shaft 24 terminates in an enlarged, fixedly-secured end section 54 which is knurled 56 to facilitate advance into and retraction of the shaft from the window zone 60 of the bow 48 by rotating the shaft 26 manually. As shown, a frusto-conical section 62 connects the shaft 26 to the enlarged end section 54. A lock nut 66 threadedly engaged on the shaft 26 serves, as indicated in FIG. 3, to limit movement of the shaft 26 inwardly into the window zone 60.

The arrow rest 70 of the invention comprises a coupler in the form of a yoke 74 consisting of a pair of spaced, parallel, leg-like plates 78 and 80 joined to one another at their upper ends 84. In the specific preferred embodiment of the invention illustrated, the legs 78 and 80 of the yoke 74 consitute an integral structure, being formed from a single sheet of material—metal or plastics, etc. That plate 78 of the yoke 74 farthest from the sidewall 90 of the bow 48 includes an integrally-formed, downwardly-directed extension 92 which is reversely looped 94 and then projects upwardly 96. At its upwardly extending terminal of the reversely looped section 96 there is secured an arrow shaft support element 100. In the embodiment of the invention shown in FIGS. 1, 2, 3 and 4, the physical element 100 on which the arrow shaft 104 rests takes the form of an upwardly-flared, flat-topped or sloped 106 wedge 100 which may be centered on the upwardly directed plate 96 or offset so it can be reversed for larger or smaller shafts. The wedge surface 106 is preferably of a low-friction, high lubricity composition such as nylon, polyurethane, fluorinated or chloro-fluorinated aliphatic hydrocarbons, or silicone plastics.

The plates 78 and 80 of the yoke 74 are formed with aligned transverse bores 110 tapped with threads 114 for mating with the cooperating threads 26 of the pressure-button-carrying shaft 24 on which the rest-supporting yoke 74 is mounted. The manner in which the yoke-carried arrow rest assembly 70 may be positioned along and locked in selectable locations on the pressure button support shaft 24 is described with reference to FIGS. 1-3.

As shown, the plates 78 and 80 of the yoke 74 are formed on respective facing inner surfaces thereof with juxtaposed and aligned, horizontally-extending, threadedly-configured elongate sectors 110. These sectors define, in combination, circumferentially interrupted threads 120. The threaded sectors 118 form a threaded passageway for receiving a matingly threaded pin or shank 124.

It is an important feature of the invention that the passage bounded by the sectors 118 and the interrupted threads 120 is tapered (FIG. 7) inwardly along its longitudinal expanse. Threaded advance of the shank 124 into the tapered passageway to engage the threads 120 forces the plates 78 and 80 apart. Conveniently, the shank 124 is formed at its outermost end with a non-circular recess or socket 126 for accepting a driving tool element such as an Allen wrench. As the plates 78 and 80 of the yoke 74 are urged laterally and forced apart by the invading threaded shank 124, enhanced frictional forces are developed between the threads 126 and 120 intercoupling the support shaft 24 with the yoke 74. With the foregoing explanation it will be readily appreciated that the yoke 74 may conveniently be positioned on the pressure-button-carrying shaft at any point along that length of the shaft 26 which extends into the window zone 60 of the bow 48. The yoke 74 may then quickly and conveniently be locked in the selected location by advancing the threaded pin 124.

Independently of the above-described operation, the pressure-button-carrying shaft 24 may have already been threadedly advanced into the window zone 60 of the bow 48 to locate the end or tip 40 of the plunger-like pressure button 32 at a desired position in the window zone 60 of the arrow. Irrespective of any order in which adjustments are made, in accordance with the present invention the arrow rest 100 and the tip 40 of the pressure button 32 may be selectively spaced from each other to accommodate a specific arrow shaft 104 diameter and may also each be adjustably positioned with reference to the sidewall 90 of the bow window to "fine tune" the bow for enhanced performance.

A second embodiment of the arrow rest assembly of the invention is shown in the fragmentary schematic, FIG. 4. As there depicted, the change involves the configuration of the extended portions of the outer plate 78 of the yoke 74a. That part of the plate at the base of the loop 94a has been flattened and broadened, and the upwardly projecting section 96a has been angled and directed toward the sidewall 92 of the bow window. As a result, the space allowed for the arrow vane 130 passage has been made larger. At the same time the support face 106 of the shaft-supporting-element 100 has been angled downwardly toward the window wall 92. As previously described, a cradle-like structure is thus provided to support the arrow shaft 104 reducing a propensity for the shaft to slide off the rest face 106.

The embodiment of the assembly shown in FIG. 5 differs from the structure of FIG. 3 in that arrow shaft engaging element 100a surmounting the upwardly projecting section 96 of the yoke assembly 74 comprises a disc 134 which caps a spring 136.

FIG. 6 shows an arrow shaft support element in the form of a vaulted, pressure-responsive spring band 140 of resilient metal or plastics, connected to the yoke arm 96 through an adapter 142.

Each embodiment of the invention is characterized in that it provides, for a side pressure button and for an arrow rest, the capability of simply and effectively adjusting the spacing of the rest and the spacing of the end of the pressure button from the sidewall of the bow window. Additionally, each embodiment also provides, independently of the other spacing setting and adjustments, the capability of adjusting the spatial separation and the orientation of the arrow rest and the pressure button with respect to one another. Each embodiment constitutes a structure which accommodates most reliably the passage of the arrow shaft vanes through the bow window with a minimum of mechanical interference. Interference with the trajectory of the arrow shaft is minimized.

The present invention has been depicted in one of its preferred embodiments. Many variations are possible, without departing from the inventive concepts embodied herein. For example, the yoke 74 may be a structure in which the arm abutting the sidewall 90 may be the longer, reversely-shaped component, while the shorter arm is the one displaced outwardly from the bow sidewall 90.

The structures described are illustrative only. Numerous changes and modifications in the physical arrangements and in structural material may be made without departing from the scope of the invention, as defined in the following claims.

What is claimed is:

1. An assembly comprising, in combination, an adjustably-positionable, resiliently-reciprocally-displacable, pressure button and an arrow rest, and means for securing said assembly at a sidewall of an archery bow in a window zone thereof, said assembly further comprising threaded support shaft means for extending through a transverse bore formed in the bow side wall at the window zone of the bow, attachment means for securing said pressure button to said threaded support shaft means to extend coaxially therefrom and to project into the window zone of the bow, said arrow rest including coupler means for lockingly mounting said arrow rest on said support shaft means, at selectable longitudinally-displaced positions therealong, said coupler means including a pair of arm-like plates disposed so as generally to parallel the sidewall of the bow, including an inwardly displaced plate and an outwardly displaced plate, one of said displaced plates having a portion extending downwardly and including a reversely looped extension projecting upwardly to constitute a support base for an arrow shaft, said support base invading said window zone and being laterally outwardly of and below a horizontally-projecting end of said pressure button, and locking means for adjustably securing said shaft means in selectable laterally displaced positions transversely of the sidewall of the archery bow.

2. The structure as set forth in claim 1 wherein said coupler means comprises a yoke defining a pair of spaced, parallel arm-like plates bridgedly joined at upper extremities thereof, and wherein said plates are formed with aligned transverse openings tapped for threadedly engaging cooperating threads formed on said threaded support shaft means extending through said openings in said plates.

3. The structure as set forth in claim 2 wherein said plates of said yoke include an inner plate having an outer surface for presentation to face a side wall of the bow presented thereto.

4. The structure as set forth in claim 2 wherein said plates of said yoke are formed on each of opposed said plates, inwardly of respective facing inner surfaces thereof, with juxtaposed and aligned horizontally extending threadedly configured elongate sectors, said sectors constituting, in combination, circumferentially interrupted thread means defining an elongate threaded passage for receiving a mating threaded shank therewithin, said passage being tapered inwardly along a longitudinal expanse thereof.

5. The structure as set forth in claim 4 and further comprising threaded shank means for threadedly advancing axially into said elongate threaded passage between said plates to effect mechanically-induced, forced divergence of said plates of said yoke to establish enhanced frictional interference forces between threads of said plates and intercoupling threads of said threaded passage between said plates to lock said yoke on said support shaft against lineal movement therealong.

6. The structure as set forth in claim 1 wherein said threaded support shaft means is threadedly engaged in a through threaded bore extending transversely through the bow-sidewall, and further comprising lock nut means threadedly engaged on exterior threads of said threaded support shaft means and rotationably displacable longitudinally along said support shaft means for positive abutment against the bow sidewall at a side thereof away from said arrow rest to lock said support shaft means in selectable positions transversely of the bow sidewall at a window zone of the bow.

7. The structure as set forth in claim 1 and further comprising an arrow shaft support element and means for securing said support element on said support base for supporting an arrow shaft resting thereon.

8. The structure as set forth in claim 1 wherein said laterally extending button support shaft and said outwardly displaced plate of said coupler means, including said reversely-looped extension of said outer plate, delineate and bound a spatial through passage for accommodating an arrow shaft fluting passing therethrough upon release of an arrow from the bow.

9. The structure as set forth in claim 1 and further comprising means independently adjustable for positioning said pressure button and for positioning said arrow rest at selectable positions laterally of the side wall of the archery bow, and for establishing selectable spacial separation between an arrow shaft engaging end of said pressure button and said arrow rest.

10. The structure as set forth in claim 1 wherein said arrow rest includes a head for supportingly engaging an arrow shaft positioned thereon and abutting said pressure button, said head having an upper, arrow-shaft-engaging support face angled upwardly and outwardly with respect to an arrow-shaft-engaging end face of said pressure button.

11. The structure as set forth in claim 1 wherein said arrow rest includes arrow-shaft-support means for imparting pressure-responsive, resilient-support characteristics to said arrow rest.

12. The structure as set forth in claim 11 wherein said arrow shaft support means includes spring means for cushioning an arrow shaft supported thereon.

13. The structure as set forth in claim 11 wherein said arrow shaft support means includes an element composed of a pressure-responsive, resilient composition.

14. The structure as set forth in claim 1 wherein said coupler means engages and is supported on said support shaft means on a window side of the sidewall of the archery bow.

* * * * *